Jan. 10, 1950 K. WATSON 2,494,217
HELICOPTER
Filed Dec. 12, 1947 2 Sheets-Sheet 2

Inventor
Kenneth Watson
By
Attorneys

Patented Jan. 10, 1950

2,494,217

UNITED STATES PATENT OFFICE 2,494,217

HELICOPTER

Kenneth Watson, Woolston, Southampton, England, assignor to The Cierva Autogiro Company Limited, London, England, a British company Application December 12, 1947, Serial No. 791,329
In Great Britain October 25, 1946

Section 1, Public Law 690, August 8, 1946
Patent expires October 25, 1966

13 Claims. (Cl. 170—135.75)

The present invention relates to helicopters having a rotor hub which is controllably tiltable in one axial plane only.

More particularly, the invention relates to rotor-driving transmission means in a helicopter of this kind, which will maintain a uniform rotational speed of the rotor, irrespective of the angle of tilt.

According to this invention, the rotor hub is driven through a pair of co-axial shafts, which are driven by the engine through differential gearing and respectively drive one and the other of two pinions coaxial with the tilting axis and meshing respectively with diametrically opposite points of a crown wheel in driving connection with the hub; and the driving connections of the pinions with the coaxial shafts are such that rotation of the latter in the same sense causes opposed rotation of the pinions thus driving the crown wheel, rotation of the pinions in the same sense, due to tilting of the crown wheel about the pinion axis being accommodated by differential rotation of the shafts.

According to a feature of this invention, one of the coaxial shafts is in two parts, coupled together through a disengageable clutch, disengagement of which allows both coaxial shafts to idle and disconnects the transmission between engine and rotor.

In one preferred form of construction, the coaxial shafts are in the plane perpendicular to the tilting axis, and each drives one of the two pinions through bevel gearing which reverses the direction of rotation of one of the pinions with respect to that of the other when the coaxial shafts rotate in the same sense. This gearing is supported in a non-rotative and non-tilting housing or bearing structure embodying trunnions, which support the pinion shafts and on which the non-rotative member of the hub-assembly is tiltably supported.

The coaxial shafts are preferably directly driven by one and the other respectively of two sun-pinions of the differential gear, whose planets are supported in a cage driven by the engine.

Figure 1:
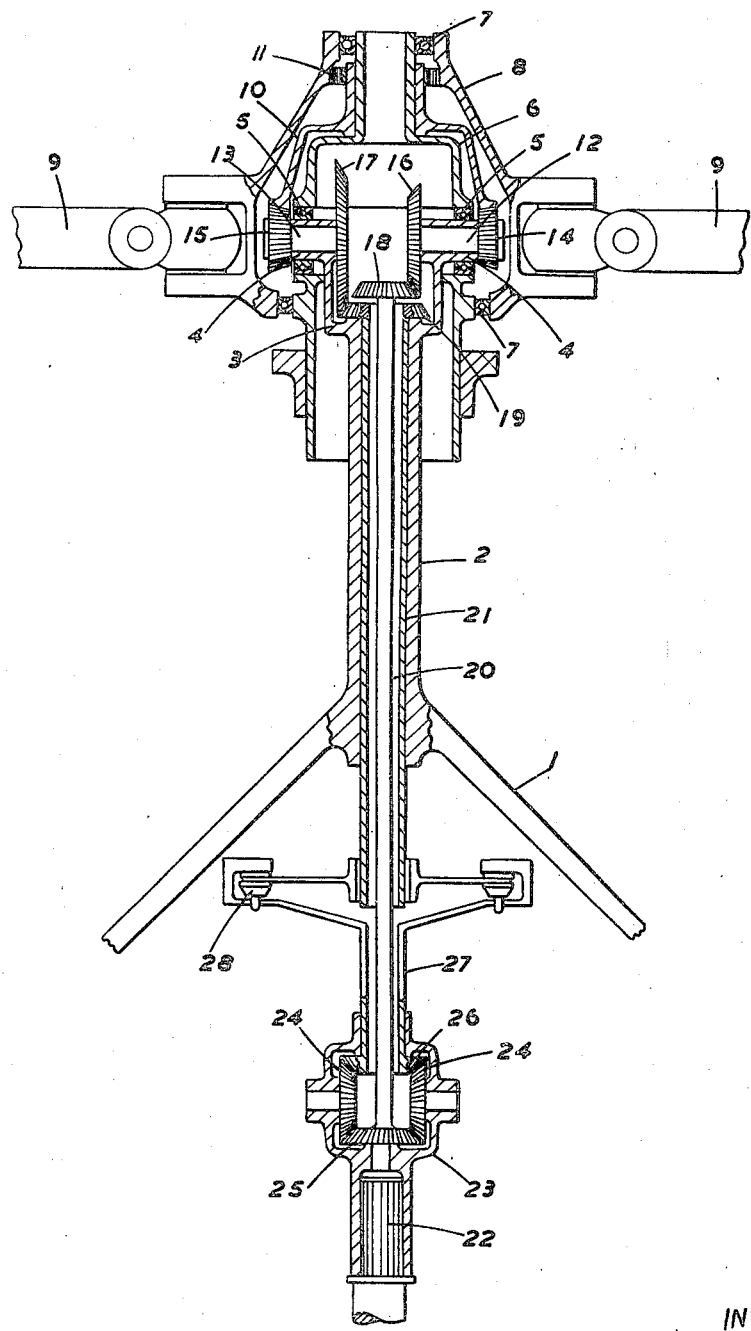
Figure 2:
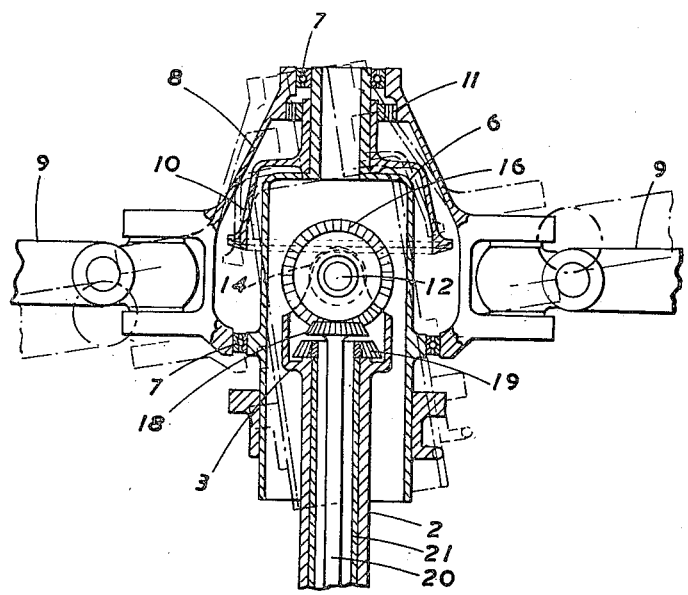

For better understanding of the invention, an example of mechanism in accordance with it is illustrated in the accompanying drawing, in which Figure 1 is a central vertical section of a rotor hub assembly and driving transmission, taken in the plane containing the hub-tilting axis, and in which Figure 2 is a vertical section through the rotor hub assembly taken at right angles to the plane of Figure 1. This drawing is entirely conventional and is only intended to illustrate the essential elements of the selected example of the invention; constructional details may be carried out in accordance with established principles and good engineering practice as well understood by competent engineers.

In the drawing, I is a pylon structure rigidly supporting a tubular mast 2 terminating in a housing or fork 3 provided with trunnions 4. The trunnions support trunnion bearings 5 on which a non-rotating hub supporting member 6 can tilt. The member 6 carries bearings 7 on which a rotor hub 8 carrying rotor blades 9 can rotate about a substantially vertical axis. A crown wheel 10 is provided with a sleeve extension which is free to rotate on the hub supporting member 6 and is connected to the hub 8 by a free-wheel coupling 11.

The trunnions 4 also support shafts 12, 13, which are coaxial with bearings 5 and free to rotate in the trunnions; and carry pinions 14, 15 meshing respectively with diametrically opposite points of the crown wheel 10. Shafts 12, 13 also carry bevel gears 16, 17 which respectively mesh with bevel gears 18, 19 carried respectively on vertical coaxial shafts 20, 21 which are supported by the fixed mast 2.

Aligned with these shafts is an engine-driven shaft 22 on which is splined an extension of a housing 23 constituting the planetary cage of a differential gear whose planet wheels 24 are meshed with a pair of sun-wheels 25, 26, the former being secured to the lower end of shaft 20 and the latter to an extension shaft 27 which is coupled to shaft 21 through clutch 28.

The torque of the engine shaft 22 is distributed between the two coaxial shafts 20 and 27 by the differential gear 23 to 26 and, when the clutch 28 is engaged, the torque of shaft 27 is transmitted to shaft 21. The torques of shafts 20 and 21 are in the same direction and are transmitted by the gearing 18, 19, 16, 17, to the shafts 12, 13, the torques in which are in opposed directions intending to rotate the pinions 14, 15 in opposite senses so that both tend to drive the crown wheel 10 in the same direction. As long as the hub-supporting member 6 is restrained from tilting on the trunnions 4, the crown wheel 10 keeps the pinions 14, 15 in step and compels them to rotate at the same speed in opposite directions. This prevents differential rotation of the shafts 20 and 21, ensuring that the engine torque is equally distributed by the differential gear between these two shafts. The mechanism therefore behaves as if the gears 16 and 17 were driven by a single shaft, their rotation being transmitted by shafts 12, 13 and the pinions 14, 15 to the crown wheel 10.

However, when the hub-supporting member 6 carrying with it the crown wheel 10 is rocked about the axis of the trunnions 4, displacement of the crown wheel rotates both the pinions 14 and 15 in the same direction, and consequently the gears 16, 17 impart equal and opposite rotations to the shafts 20 and 21. These differential displacements are accommodated by the differential gear 23 to 26 in the known manner.

When the clutch 28 is disengaged, thus disconnecting the shaft extension 27 from the shaft 21, the differential gear becomes free of restraint, rendering the rotor and the engine shaft independent of one another and allowing either or both to rotate freely.

It will be evident that, since rotation is transmitted to the hub by pinions coaxial with the trunnion axis, about which the hub tilts, the angular velocity of the hub is constant, and independent of the degree of tilt; and further, that owing to the connection of these pinions to the engine shaft through a differential gear, the driving mechanism of the hub imposes no restraint on tilting displacement thereof.

It will also be evident that the torque-reaction of the crown wheel is entirely transmitted through shafts 12, 13 and the trunnions 4 to the fixed structure, and no part of it is transmitted to the member 6 and the hub-tilting controls.

I claim:

1. In an aircraft having a tiltably mounted sustaining rotor, rotor drive mechanism including a gear connected with the rotor, a pair of rotor drive shafts, gearing connecting said shafts with said first gear including pinions arranged coaxially with a rotor tilting axis, and torque equalizing gearing for driving the shafts of said pair in the same direction.

2. A construction according to claim 1 and further including a disconnectible clutch in one of said shafts between the torque equalizing gearing and one of said pinions.

3. In an aircraft having a sustaining rotor, rotor driving mechanism including in combination with a power shaft, a pair of rotor drive shafts, gearing connecting the shafts of said pair with the rotor, torque equalizing gearing connecting the shafts of said pair with the power shaft, and a disconnectible clutch in one of the shafts of said pair between said first and second gearings.

4. In an aircraft having a sustaining rotor with a hub mounted on a pivot to provide for tilting movement thereof, rotor drive mechanism including a pair of pinions arranged coaxially with the hub mounting pivot, a gear connected with the hub and meshing with said pinions, and torque equalizing driving means for driving said pinions in opposite directions.

5. A construction according to claim 4 in which the torque equalizing driving means includes a pair of drive shafts geared respectively to said pinions, a power shaft, and differential gearing inter-connecting the power shaft and said pair of shafts.

6. In an aircraft having a tiltably mounted sustaining rotor, rotor drive mechanism comprising in combination with a power shaft, a gear connected with the rotor and tiltable therewith, a pair of rotor drive shafts, gearing connecting said pair of shafts with said first gear, and differential gearing connecting said pair of shafts with said power shaft.

7. In an aircraft having a tiltably mounted sustaining rotor, rotor drive mechanism comprising in combination with a power shaft, a gear connected with the rotor and tiltable therewith, a pair of rotor drive shafts, gearing connecting said pair of shafts with said first gear including pinions arranged coaxially with a rotor tilting axis, and differential gearing connecting said pair of shafts with said power shaft.

8. In an aircraft having a tiltably mounted sustaining rotor, rotor drive mechanism comprising in combination with a power shaft, a gear connected with the rotor and tiltable therewith, a pair of rotor drive shafts one of which incorporates a disconnectible clutch, gearing connecting said pair of shafts with said first gear, and differential gearing connecting said pair of shafts with said power shaft.

9. In a helicopter having a power-plant and a rotor whose hub is controllably tiltable in one axial plane only, rotor driving transmission mechanism including differential gearing and two coaxial shafts driven by the power-plant through the differential gearing, a crown-wheel in driving connection with the hub, and two pinions driven respectively by the shafts, arranged coaxially with the hub-tilting axis and meshing respectively with diametrically opposite points of the crown-wheel, so that rotation of the two shafts in the same sense causes opposed rotation of the pinions and drives the crown-wheel and hub, but tilting of the hub rotates both pinions in the same sense causing opposed rotation of the shafts, which the differential gearing allows to take place freely.

10. Helicopter transmission mechanism as claimed in claim 9, further including a disengageable clutch, and in which one of the coaxial shafts is driven by the differential gearing through the disengageable clutch.

11. Helicopter transmission mechanism as claimed in claim 9, further including bevel gearing and in which the coaxial shafts are perpendicular to the pinion and hub-tilting-axis and each drives its associated pinion through the bevel gearing.

12. Helicopter transmission mechanism as claimed in claim 11, further including a non-rotative and non-tilting rigid structure supporting the coaxial shafts and bevel gearing and in which said structure is provided with hollow trunnions on which a non-rotative member of the hub-assembly is tiltably mounted and still further in which the trunnions comprise bearings in which the pinions engaging the crown-wheel are mounted.

13. Helicopter transmission mechanism as claimed in claim 9 and further including a free-wheel coupling through which the crown-wheel drives the hub.

KENNETH WATSON.

REFERENCES CITED

The following references are of record in the file of this patent:

UNITED STATES PATENTS

| Number | Name | Date |
|---|---|---|
| 317,731 | Colman et al. | May 12, 1885 |
| 346,674 | Newell | Aug. 3, 1886 |
| 883,090 | Cragun | Mar. 24, 1908 |
| 936,916 | Lee | Oct. 12, 1909 |
| 1,356,534 | Lemire | Oct. 26, 1920 |
| 2,192,300 | Droitcour | Mar. 5, 1940 |
| 2,383,139 | McGuire | Aug. 21, 1945 |
| 2,437,330 | Mullgardt | Mar. 9, 1948 |

FOREIGN PATENTS

| Number | Country | Date |
|---|---|---|
| 64,392 | Austria | Apr. 10, 1914 |